United States Patent [19]

Terai et al.

[11] Patent Number: 5,555,322
[45] Date of Patent: Sep. 10, 1996

[54] IMAGE STORING DEVICE FOR ELECTRONIC FILING SYSTEM

[75] Inventors: Hideo Terai, Kyoto; Akira Itoh, Nagaokakyo; Teruyuki Kitaguchi, Neyagawa, all of Japan

[73] Assignee: Matsushita Electric Industrial Co., Ltd., Osaka, Japan

[21] Appl. No.: 213,714

[22] Filed: Mar. 16, 1994

[30] Foreign Application Priority Data

Mar. 17, 1993 [JP] Japan ................................. 5-057475

[51] Int. Cl.$^6$ ............................................. G06K 9/36
[52] U.S. Cl. .......................... 382/232; 382/233; 382/235; 358/261.2; 358/426
[58] Field of Search ................................. 382/232, 233, 382/235, 226; 364/419.12; 348/580; 358/261.2, 426

[56] References Cited

U.S. PATENT DOCUMENTS

| Re. 33,316 | 8/1990 | Katsuta et al. | 382/232 |
|---|---|---|---|
| 3,789,361 | 1/1974 | Cortez | 382/226 |
| 4,764,975 | 8/1988 | Inoue | 382/233 |
| 4,843,632 | 6/1989 | Lee et al. | 382/233 |
| 4,920,414 | 4/1990 | Remus et al. | 382/233 |
| 4,955,061 | 9/1990 | Doi et al. | 382/233 |
| 5,168,374 | 12/1992 | Morimoto | 382/232 |
| 5,231,679 | 7/1993 | Matsuura et al. | 382/232 |
| 5,237,397 | 8/1993 | Mighdoll et al. | 358/426 |
| 5,243,667 | 9/1993 | Hirosawa et al. | 358/426 |
| 5,301,032 | 4/1994 | Hong et al. | 358/261.2 |
| 5,329,616 | 7/1994 | Siverbrook | 382/233 |

FOREIGN PATENT DOCUMENTS

| 57-199072 | 12/1982 | Japan | G06F 15/40 |
|---|---|---|---|
| 58-87660 | 5/1983 | Japan | G06F 15/40 |

Primary Examiner—Jose L. Couso
Assistant Examiner—Anh Hong Do
Attorney, Agent, or Firm—Price, Gess & Ubell

[57] ABSTRACT

An image storing device for compressing an original image, storing the compressed image, and expanding the stored image while enabling a high speed searching for stored image data is provided. An encoded data classification unit can classify the encoded and compressed data into reduced data output and an unreduced data output. Both the reduced and unreduced data output are stored and a selective reading unit can address this data. The data can be decoded and expanded and an arrangement control unit can arrange a sequence to the data so that the original image is reproduced when operating upon the unreduced data and when operating upon the reduced data, only encoded and compressed corresponding to scanning lines which are subject to reduced output are decoded and expanded after being reduced in a line direction.

2 Claims, 12 Drawing Sheets

IMAGE STORING DEVICE FOR ELECTRONIC FILING SYSTEM

BACKGROUND OF THE INVENTION (1) Field of the Invention

The present invention relates to an image storing device which can be suitably applied to an electronic filing system, and in particularly, to the image storing system capable of storing a plurality of encoded, compressed images and displaying objective decoded, expanded images.

(2) Description of the Related Art

According to a recent electronic filing system, it has become possible to store an encoded and compressed data instead of an original image data. By storing the encoded, compressed data, the memory capacity of the filing system can be enhanced. Then, the file data is decoded and expanded into the original image data, and outputted to a printer; otherwise it is displayed on a Cathode-Ray Tube (CRT) display unit or a liquid crystal display unit. When a massive amount of the encoded, compressed data is stored, it takes time to retrieve the objective data. Accordingly, an improved method of successively retrieving and displaying the objective data at a high speed has been longed for.

Generally, the resolution of a display unit, such as a CRT, is lower than the resolution of a printer. Accordingly, to realize a high-speed output onto the display unit, reduction images are stored for the high-speed display besides storing a usual image for a printer.

An image storing device which is applied to the conventional electronic filing system will be described.

FIG. 1 shows the configuration of the image storing device including an image memory 11 for storing an original image data scanned with an optical scanner, an encoding and compressing unit 12 for encoding the original image data and compressing it, an encoded data memory 13 for storing the encoded, compressed data, a decoding and expanding unit 14 for decoding and expanding the encoded, compressed data, an image data delivery unit 15 for delivering the original image data from the image memory 11 to the encoding and compressing unit 12, an encoded data delivery unit 16 for delivering the encoded, compressed data from the encoding and compressing unit 12 to the encoded data memory 13 and for delivering the encoded, compressed data from the encoded data memory 13 to the decoding and expanding unit 14, an output unit 17 comprised of the printer, liquid cathode-ray tube, liquid crystal display, or the like which is dedicated to output the decoded, expanded image data derived from the decoding and expanding unit 14, an image reduction unit 18 for reducing the original image data from the image memory 11, and a reduced, encoded data memory 19 for storing the encoded (compressed), reduced data.

The storing of an image data (storing the image data which can be accessed to be reproduced) and the high-speed output to the display unit will be described.

An image data will be stored.

(1) Receiving the image data from the image memory 11, the image data delivery unit 15 delivers it to the encoding and compressing unit 12.

(2) The encoding and compressing unit 12 encodes and compresses the image data simultaneously.

(3) The encoded data delivery unit 16 delivers the encoded, compressed data from the encoding and compressing unit 12 to the encoded data memory 13. The encoded data memory 13 stores the encoded, compressed data.

A reduced image data will be stored.

(4) According to a resolution of the display unit, the image reduction unit 18 reduces the original image data from the image memory 11. As an exemplary means, the original image data is subdivided into 9 (3×3) subregions in advance and the subregion positioning at the bottom row and the left column will be selected. Otherwise, the nine subregions will be averaged into 1×1 subregion. Accordingly, the original image data will be reduced into one-third by size.

(5) The image data delivery unit 15 delivers the reduced image data from the image reduction unit 18 to the encoding and compressing unit 12.

(6) The encoding and compressing unit 12 encodes the reduced image data from the image data delivery unit 15 and compresses it.

(7) The encoded data delivery unit 16 delivers the encoded, compressed data from the encoding and compressing unit 12 to the reduced, encoded data memory 19; and the reduced, encoded data memory 19 stores it.

An encoded, compressed data will be outputted.

When outputting the encoded, compressed data which is not reduced, the encoded data delivery unit 16 retrieves the encoded, compressed data from the encoded data memory 13, and delivers it to the decoding and expanding unit 14. The decoding and expanding unit 14 decodes and expands the encoded, compressed data, and provides the decoded data to the image data delivery unit 15. The decoded data from the image data delivery unit 15 is printed by the printer in high quality.

A reduced image will be displayed at a high speed.

(8) The encoded data delivery unit 16 retrieves the encoded (compressed), reduced data from the reduced, encoded data memory 19, and delivers it to the decoding and expanding unit 14.

(9) The decoding and expanding unit 14 decodes and expands the encoded (compressed), reduced data into the original reduced image data. Since the data amount of the reduced data is relatively small, the encoded (compressed), reduced data will be decoded and expanded at a high speed.

(10) The image data delivery unit 15 delivers the decoded, reduced image data from the decoding and expanding unit 14 to the output unit 17.

(11) The output unit 17 displays the decoded, reduced image data on the CRT or the like at a high speed.

Thus, according to the conventional image storing device, in order to display successive images at a high speed for searching, the image storing device reduces the original images in advance, encodes and compresses the reduced images, then stores the encoded, compressed data of the reduced images besides storing the encoded, compressed data of the original images. Therefore, when a high-speed display is desired, the encoded, compressed data of the reduced images is decoded and expanded.

Thus, by storing the encoded, compressed data of the reduced images, the display speed can be enhanced; however, the total data amount is increased thereby. Additionally, the data amount for an image data is great even for a reduced image.

When the original document includes characters, it is preferable to reduce the document both in the horizontal and vertical directions at the same reduction rate so that the characters are easily recognized. When the original document includes a diagram, on the other hand, it is preferable to enhance the display speed by reducing it only in the vertical direction or reducing only a left half of the original document.

Furthermore, when the original document includes characters which would be hardly recognizable if reduced at a large reduction rate, a small reduction rate should be applied. Thus, it is desirable to change the reduction rate freely.

SUMMARY OF THE INVENTION

Accordingly, it is a primary object of the present invention to provide an image storing device at a reasonable price, the image storing device dedicated to output both original images and reduced images for searching without increasing the total data amount, and display the reduced images appropriately in accordance with their characteristics as well as perform a successive display at a high-speed.

The above object may be fulfilled by an image storing device for compressing an original image, and storing the compressed image as well as expanding the storing image, and outputting the expanded image, said image storing device comprising an encoding unit for encoding and compressing image data, an encoded data classification unit for classifying the encoded, compressed data into data for reduced output and data for unreduced output according to a reduction rate which represents a ratio of reduced output to unreduced output, a first storing unit for storing the data classified for reduced output, a second storing unit for storing the remaining data, a selective reading unit for reading the data from the first storing unit when operating reduced output, and reading the data from the first storing unit and the second storing unit when operating unreduced output, a decoding unit for decoding and expanding the data read by the selective reading unit, an arrangement control unit for arranging a sequence of the data read from the first storing unit and the second storing unit so that the original image is reproduced when operating unreduced output, and an output unit for outputting the decoded data from the decoding unit.

The encoding unit may encode the image data in a main scanning direction of scanning lines contained in the output unit, and operates one-dimensional compression.

A classification rate for the encoded data classification unit may be determined by the number of scanning lines which are subjected to a two-dimensional compression, the scanning lines being a part of the data which was compressed unidimensionally.

The arrangement control unit may have a line reduction control unit for compressing the decoded data in the main-scanning direction and outputting the data on the output unit.

The line reduction control unit may be capable at least one of compressing the decoded data in the main-scanning direction at a reduction rate which is identical to the classification rate, and compressing the decoded data in the main-scanning direction at a reduction rate which is different from the classification rate.

The selective reading unit may have a data reading unit from the first storing unit and the second storing unit, the data reading unit reading the data exclusively from the first storing unit or the second storing unit.

The selective reading unit may have a data reading unit from the first storing unit and the second storing unit, the data reading unit reading the data exclusively from the first storing unit or the second storing unit.

Also the above object may be fulfilled by an image storing device for compressing an image and storing the compressed image as well as expanding the storing image and outputting the expanded image, the image storing device comprising an encoding unit for encoding and compressing image data, an encoded data block classification unit for dividing the encoded data into some blocks and classifying the blocks into blocks which are subjected to reduced output and the remaining blocks, a first storing unit for storing the blocks of encoded data classified for reduced output, a second storing unit for storing the blocks of the remaining encoded data, a selective reading unit for reading the data from the first storing unit block by block when operating reduction output, and reading the data from the first storing unit and the second storing unit block by block when operating unreduced output, a decoding unit for decoding and expanding the data read by the selective reading unit, an arrangement control unit for arranging a sequence of the data read from the first storing unit and the second storing unit so that the original image is reproduced when operating unreduced output, and an output unit for outputting the decoded data from the decoding unit.

The first storing unit may be placed closer to a reading position than the second storing unit.

The selective reading unit may have a data reading unit from the first storing unit and the second storing unit, the data reading unit reading the data exclusively from the first storing unit or the second storing unit.

The order of the blocks in the first storing unit and in the second storing unit may correspond to an output order in the output unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows an image data which is stored and outputted according to the second embodiment, in which

FIG. 10 shows an image data which is stored and outputted according to the third embodiment, in which

DESCRIPTION OF THE PREFERRED EMBODIMENTS

Embodiment 1

A first embodiment will be described as referring to FIGS. 2 through 5. For convenience of the explanation, it is supposed that the reduction rate is ¼.

Figure 1:
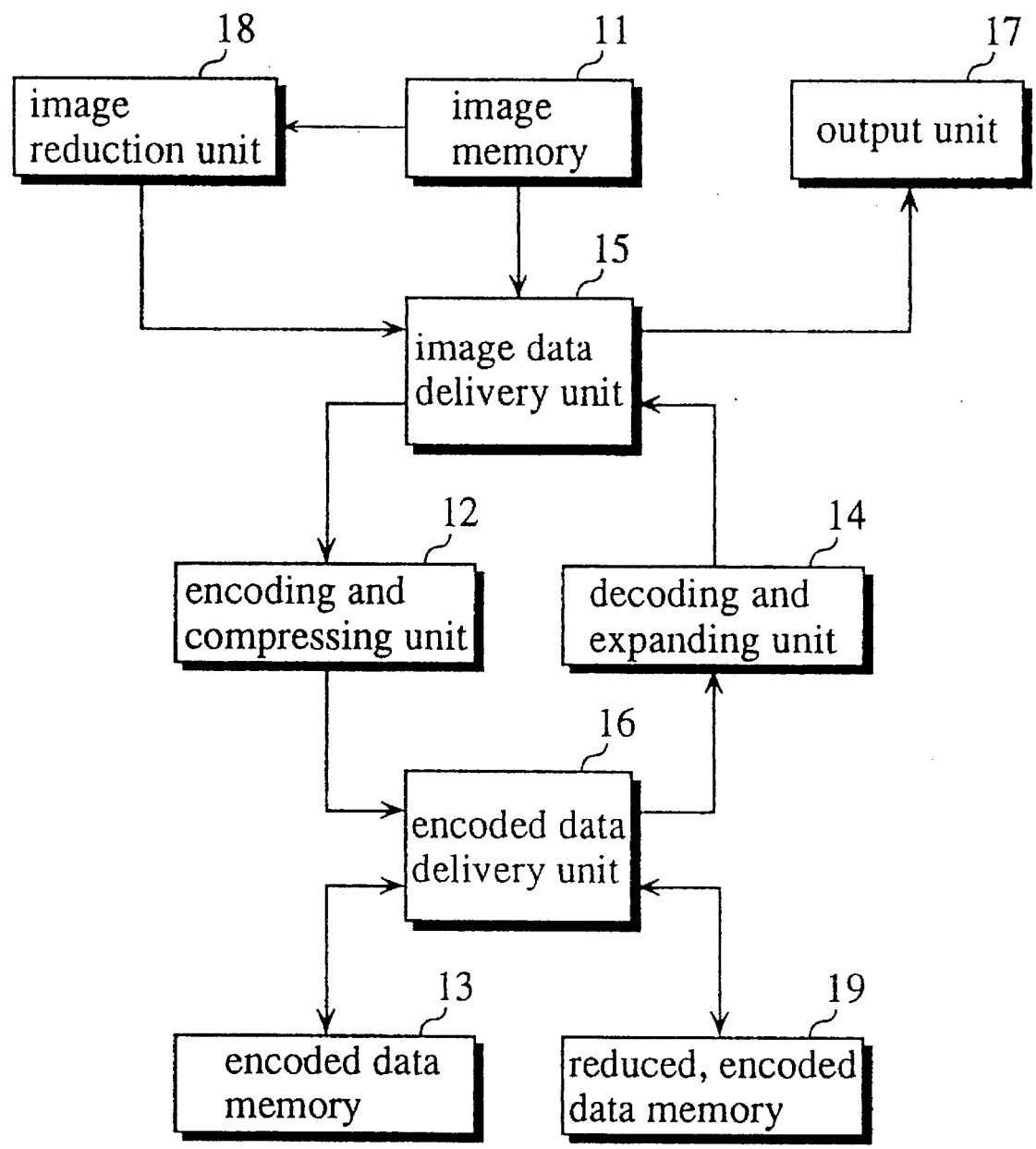
FIG. 1 shows the configuration of a conventional image storing device.
Figure 2:
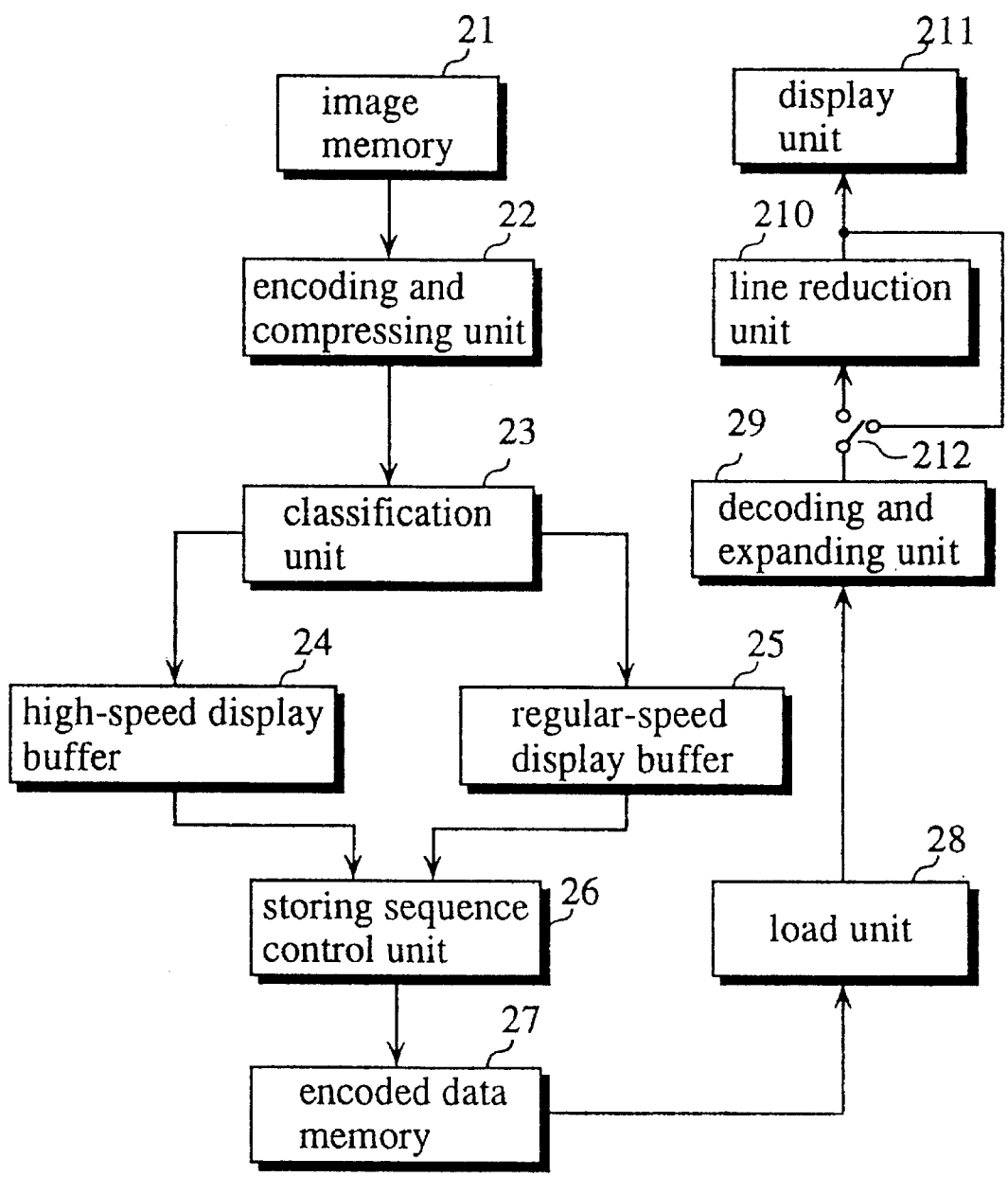
FIG. 2 shows the configuration of a first embodiment.

FIG. 2 shows the configuration of an image storing device according to the present invention.

An image memory 21 stores the image data.

An encoding and compressing unit 22 encodes and compresses the image data per a scanning line. The image data is encoded according to an MH (Modified Huffman) coding or a MR (Modified READ) coding (K=4) for a G3 facsimile system.

A classification unit 23 classifies the encoded, compressed data from the encoding and compressing unit 22 into the data for reduction output and the remaining data; and delivers the data for reduction output to a high-speed display buffer 24 and the remaining data to a regular-speed display buffer 25. To be noted, the classified data can be a single horizontal scanning line or a set of consecutive scanning lines which place along with the vertical direction. Herein, a single line represents a scanning line of the original image data. To classify the encoded, compressed data and to deliver the classified data to the buffers, the classification unit 23 accommodates a counter which is incremented by one whenever a single line of encoded data is inputted and is cleared when the counter's value reaches four; and a judge unit dedicated to judge that the input data is for high-speed display when the counter's value is one. A horizontal synchronizing signal or an EOL (End of Line) signal is inserted at the end of each encoded line in advance; accordingly, the counter is incremented whenever one of the horizontal synchronizing signal and the EOL signal is detected. Also, as the reduction rate is ¼, the counter is cleared when the counter's value reaches four.

According to the MR coding system (K=4), among a set of four consecutive lines, the first line is encoded at one dimension, and the following three lines are encoded at two dimensions. Thus, the line for reduction output is encoded at one dimension and the remaining lines are encoded at two dimensions. Accordingly, the line for reduced output can be retrieved easily.

A high-speed display buffer 24 temporarily stores the encoded data which correspond to the lines for reduction output, said lines being a part of the image data from the image memory 21.

Figure 3:
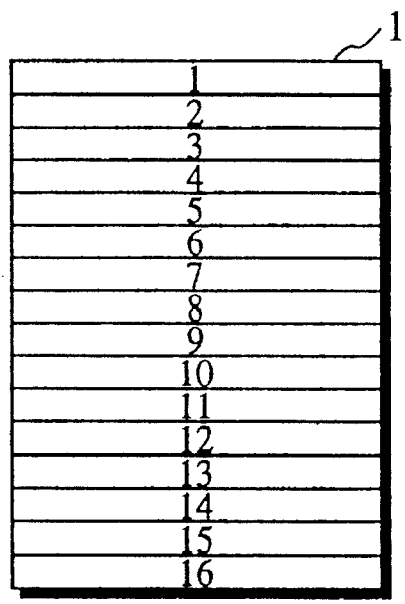
FIG. 3 illustrates an image data which is stored and outputted according to the first embodiment.
Figure 3:
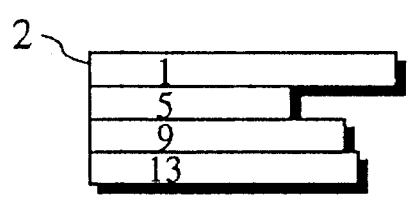
Figure 3:
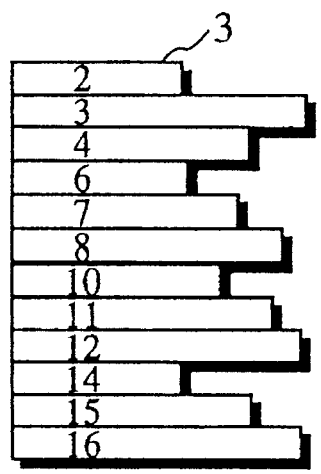
Figure 3:
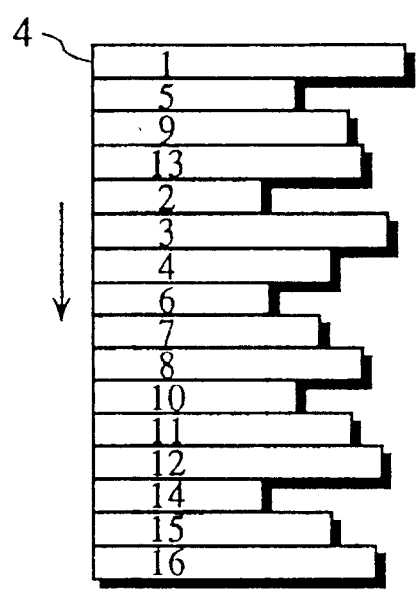
Figure 3:
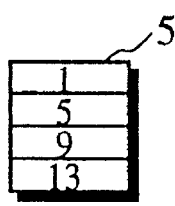

A regular-speed display buffer 25 temporality stores the encoded data which does not correspond to the lines for reduction output, said lines being a part of the image data from the image memory 21. As an example, FIG. 3 (1) shows the image data which includes 16 lines; and FIG. 3 (2) shows the encoded data which corresponds to the first, fifth, ninth, and thirteenth lines of the image data, and is stored in the high-speed display buffer 24. FIG. 3 (3) shows the encoded data which corresponds to the second, third, fourth, sixth, seventh, eighth . . . lines of the image data, and is stored in the regular-speed display buffer 25.

A storing sequence control unit 26 arranges a storing sequence of the encoded data into an encoded data memory 27 so that the encoded data from the high-speed display buffer 24 will be retrieved first, then the encoded data from the regular-speed display buffer 25 will be retrieved next. It is assumed herein that the user prefers to display the reduced images successively at a high speed on the CRT prior to output the objective original image to the printer.

The encoded data memory 27 stores the encoded data. Because of the storing sequence control unit 26, the encoded data which reaches the encoded data memory 27 first receives the memory position from which the memory reading starts (reading start position), and the encoded data which reaches later will be read thereafter. FIG. 3 (4) shows the encoded data in the encoded data memory 27, in which the arrow represents the reading order.

A load unit 28 reads the encoded data from the encoded data memory 27 and mounts it onto a decoding, expanding unit 29. Depending on which output mode, either high-speed output or regular-speed output, is designated by the user, the load unit 28 changes the reading order. More specifically, when the user designates high-speed output, the load unit 28 reads a predetermined number of lines starting with the reading start position from the encoded data memory 27. When the user designates regular-speed output, on the other hand, the load unit 28 reads the encoded data for high-speed output and the remaining encoded data interchangeably in accordance with the reduction rate. Since the reduction rate is ¼ herein, after reading one line of the encoded data for high-speed output, the load unit 28 reads three lines of the remaining encoded data. To control this reading, the load unit 28 accommodates a line number counter which is cleared when its value reaches four, a judgement unit for judging if the counter's value is one or not, and a control unit for controlling to retrieve the encoded data for high-speed output when the judgement unit judges that the counter's value is one, while controlling to retrieve the remaining encoded data when the judgement unit judges that the counter's value is other than one.

A decoding, expanding unit 29 decodes and expands the encoded, compressed data.

A line reduction unit 210 reduces the decoded, expanded image from the decoding, expanding unit 29 along with the horizontal direction line by line. More specifically, every pixel within each line is divided into pixel groups, then the pixel positioning at the left end of each pixel group will be extracted. The line reduction unit 210 will be turned on only when the user designates high-speed output and line reduction with a change-over switch 212. Otherwise, the decoded, expanded data will be outputted on the output unit 211 without being reduced in the horizontal direction. The line reduction together with the reduction in the vertical direction improve recognizability of characters contained in the document data. That is, by reducing the data both in the vertical and horizontal directions at the same reduction rate, each character will be recognized more easily. Especially when recognizing a document in an unfamiliar foreign language Arabic to Japanese users or Chinese and Japanese to Western user), the additional line reduction is significantly effective. In contrast, if the document data contains only a diagram which can be easily recognized and whose data amount is not so great, a faster display will be achieved by omitting the line reduction.

The output unit 211 which includes the printer for regular-speed output or the CRT for high-speed output is also accommodated.

Besides above units, the image storing device accommodates well known units, including a keyboard with which a still output mode for outputting the original image or a flip-page output mode for outputting the reduced images is designated as well as the objective reduced image is selected from the reduced images; a floppy disk etc for storing a new image data; and various type of switches.

Also when storing a number of documents, hardware or software successively flips pages of retrieved images on the output unit. When storing a large number of documents, selection based on key-words may be used to narrow the range of the documents to be retrieved prior to the flip-page searching; then the hardware or software transfers the selected documents to a buffer for temporarily storing the selected documents therein. These units are well known and do not fall within the scope of the present invention, so that the illustration or description thereof will be omitted.

The classification, storing, reading of the encoded data according to the embodiment will be described.

Figure 4:
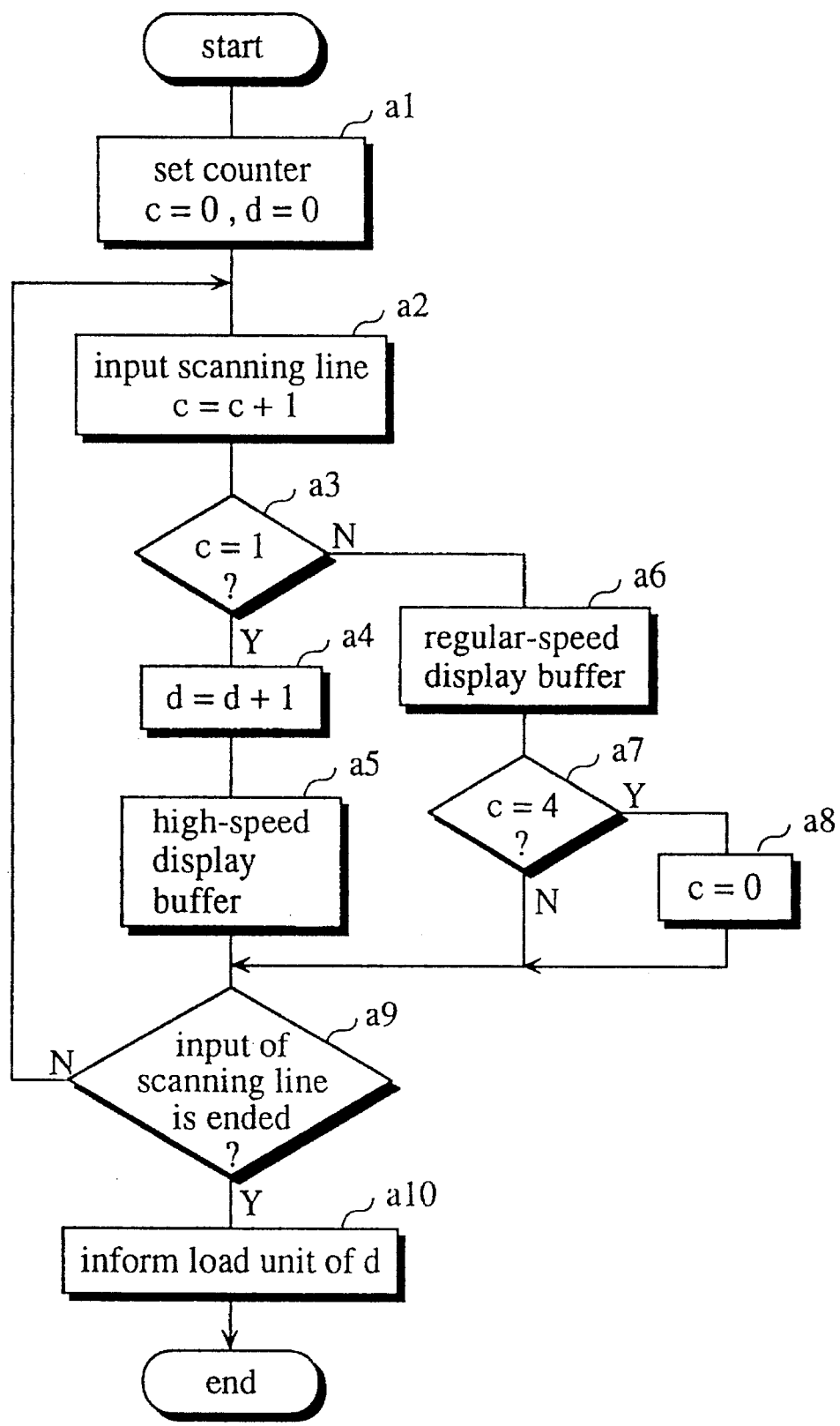
FIG. 4 is a flow chart mainly showing the operation of a classification unit in the first embodiment.

FIG. 4 is a flow chart showing the classification of the encoded data by the classification unit 23.

The classification unit 23 receives the encoded data from the encoding and compressing unit 22. Zero is set to a counter c and a counter d as initial value, the counter c dedicated to classify the scanning lines and the counter d dedicated to count the scanning lines which are delivered to the high-speed buffer 24 (a1). The counter c is incremented by one at each input of an encoded data of a scanning line (a2). If the value of the counter c is one (a3), the encoded data is stored into the high-speed display buffer 24 (a5), and the counter d is incremented by one (a4). Otherwise, the encoded data is stored in the regular-speed display buffer 25 (a6). It is judged if the value of the counter c reaches four (a7), and the counter c is cleared to zero if the counter's value is four (a8). When the input is completed, the classification unit 23 is turned off (a9), and the value of the counter d is inputted to a load unit 28 to indicate the number of scanning lines to be displayed at a high speed (a10).

The storing sequence control unit 26 reads the encoded data from the high-speed display buffer 24, and stores it at a memory position of the encoded data memory 27 which will be read first; then reads the encoded data from the regular-speed display buffer 25 and stores it at a memory position of the encoded data memory 27 which will be read next.

The reading will be described. When outputting reduced images, the load unit 28 reads the encoded data from the encoded data memory 27 in order, and delivers it to the decoding and expanding unit 29. The reading operation will be terminated immediately after the encoded data corresponding to the first, fifth, ninth, and thirteenth lines is read. That is, the reading will be terminated when the classification unit 23 notifies that the counter d indicates four.

The decoding and expanding unit 29 decodes and expands the encoded data corresponding to the four lines (first, fifth, ninth, and thirteenth), and delivers the decoded data to a line reduction unit 210.

The line reduction unit 210 reduces the image which corresponds to the first, fifth, ninth, and thirteenth lines, into one-fourth in the horizontal direction (line direction).

The line reduction unit 210 reduces each scanning line into one-fourth by extracting one pixel for every four pixels within each scanning line. The line reduction rate (¼) is determined according to the reduction rate in the vertical direction. Since the quality of the reduced images is not necessarily high for searching use, each line is reduced by extracting one pixel for every four pixels instead of making an average of four pixels, whereby the configuration of the software or hardware is simplified; the line reduction rate can be easily changed; and the non-resemblance in shape between the display unit and the original document can be overcome easily.

Basically, the algorithm for extracting one pixel for every four pixels is the same as FIG. 4, except that the counter d at the step (a4) is not included; also the destination of the step (a5) is the output unit 211 as well as the pixels at the step (a6) will be ignored. Therefore, the description of the algorithm will be omitted herein.

The output unit 211 outputs the reduced image. In FIG. 3, a reduced image 5 is one-fourth of the original image 1.

The arranging of the scanning lines to output the unreduced image will be described.

Figure 5:
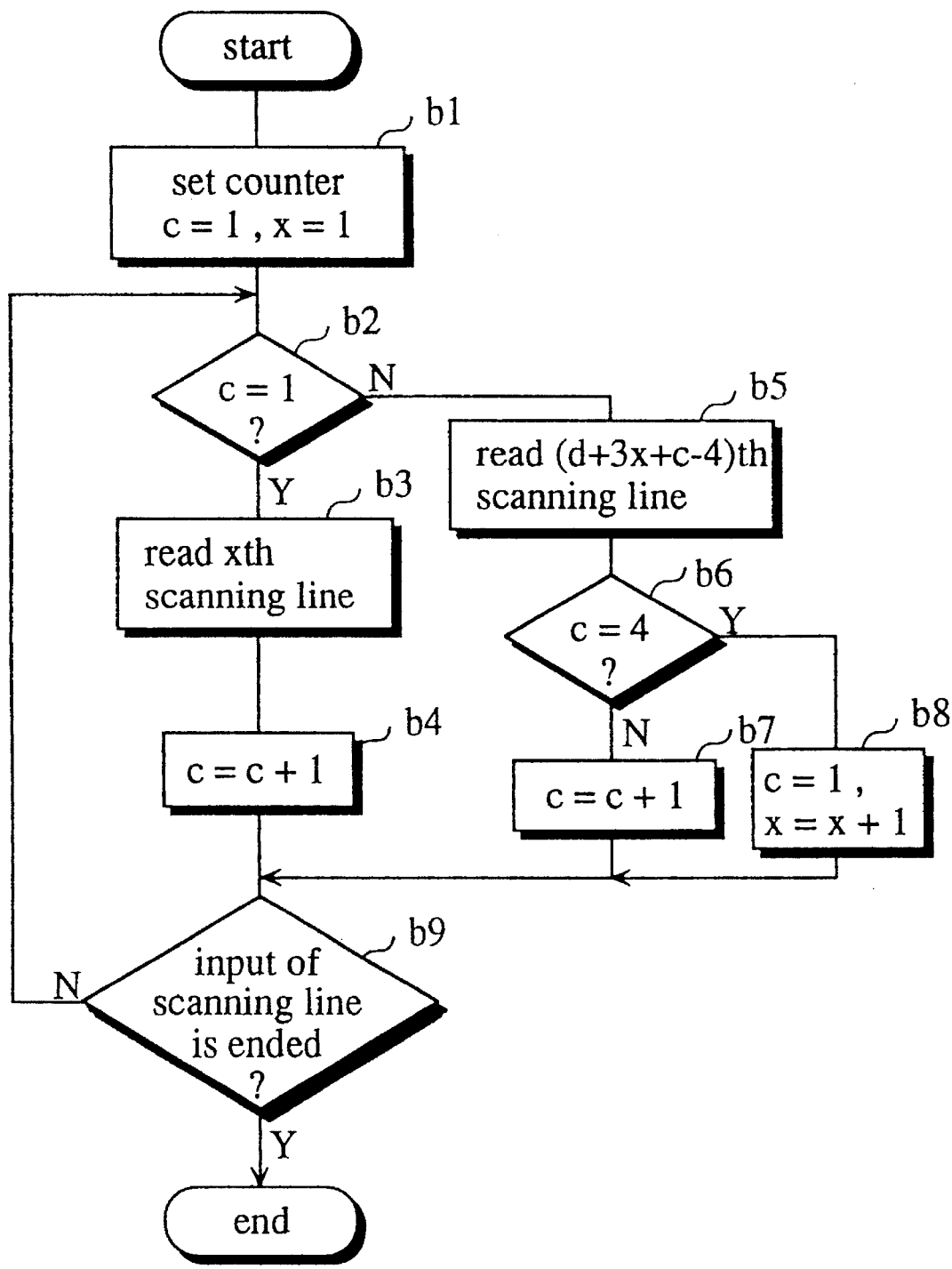
FIG. 5 is a flow chart showing the retrieval operation of a load unit in the first embodiment.

The load unit 28 operates oppositely to the classification unit 23, and this will be described as referring to FIG. 5. The load unit 28 uses the counter c, a counter x, and the value d informed by the classification unit 23 (b1). At the (4(x−1)+1)th reading (x=1,2,3,4), the xth scanning line is read (b2, b3), and it is sent to the decoding and expanding unit 29. At the (4(x−1)+c)th reading (x=1,2,3,4, and c=2,3,4), the (d+3x+c−4)th scanning line is read (b2, b5), and it is sent to the decoding and expanding unit 29. This reading will continue until the last scanning line is read (b9). The counter c is set to be one when its value reaches four (b6, b8). Then, the encoded data which correspond to the scanning lines will be decoded and expanded into the unreduced image.

Embodiment 2

Figure 7:
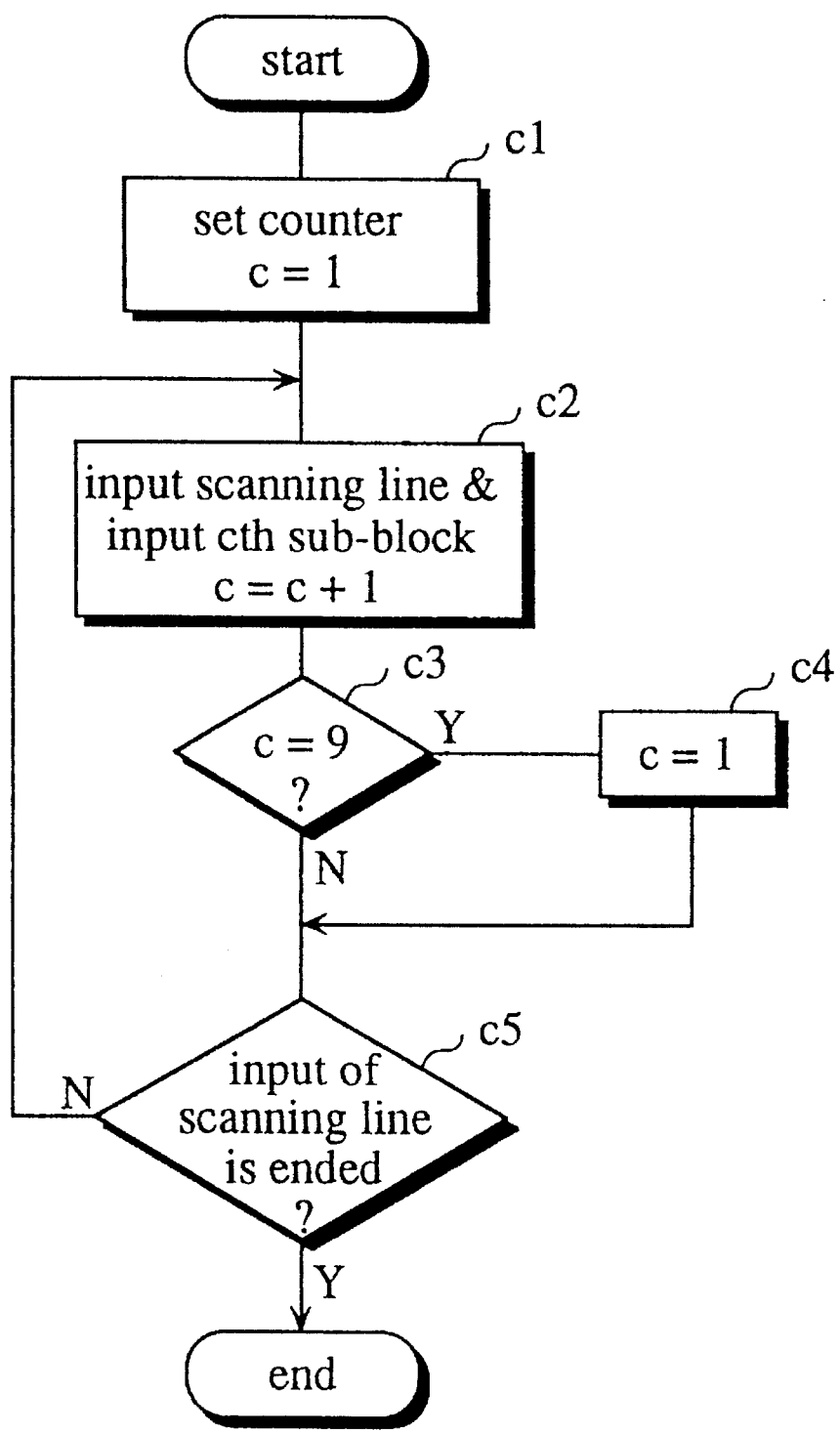
FIG. 7 is a flow chart showing the classification operation in the second embodiment.
Figure 8A:
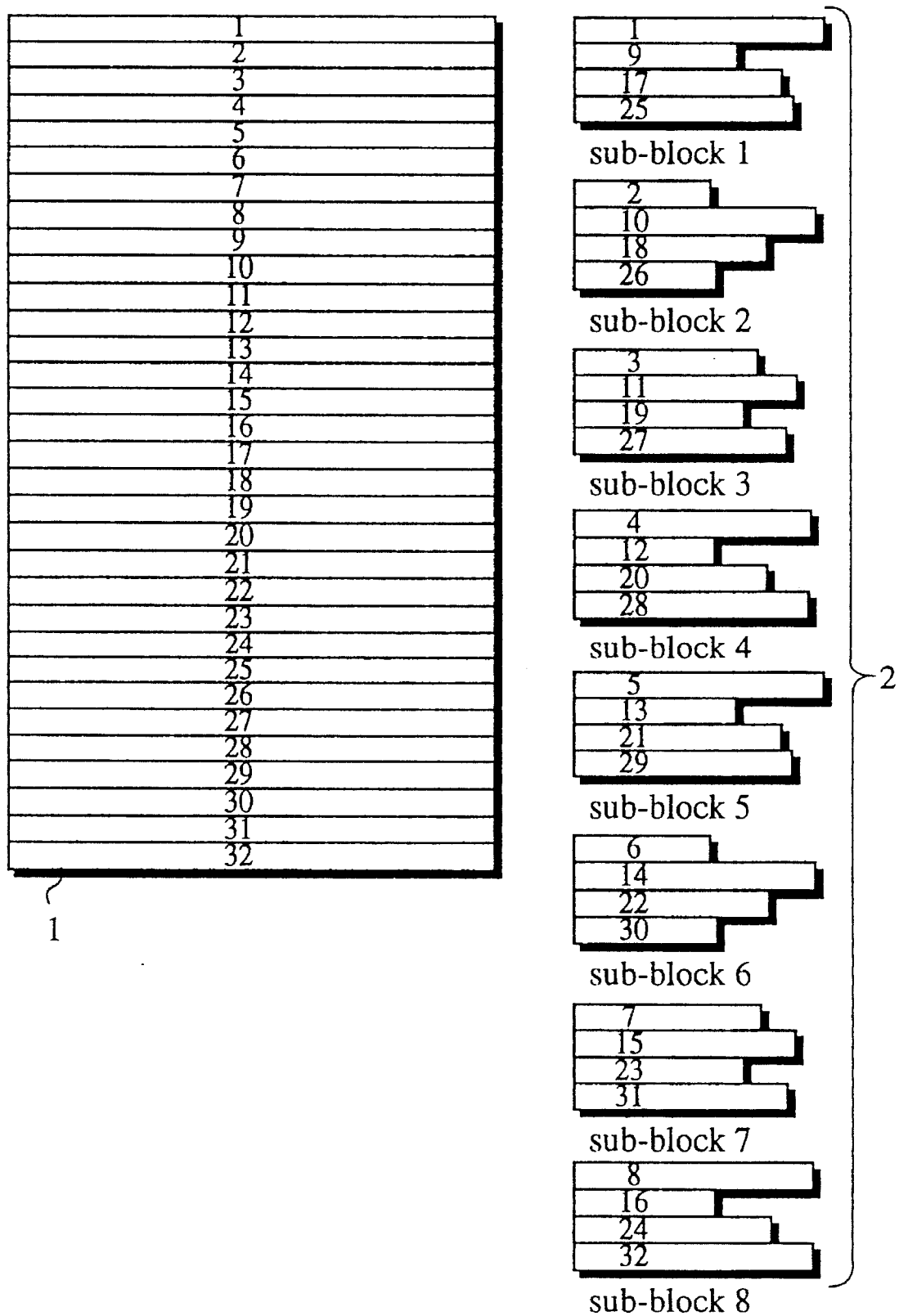
FIG. 8A and FIG. 8B show a first and a second half of the image data respectively.

A second embodiment will be described as referring to FIGS. 6 through 8.

Figure 6:
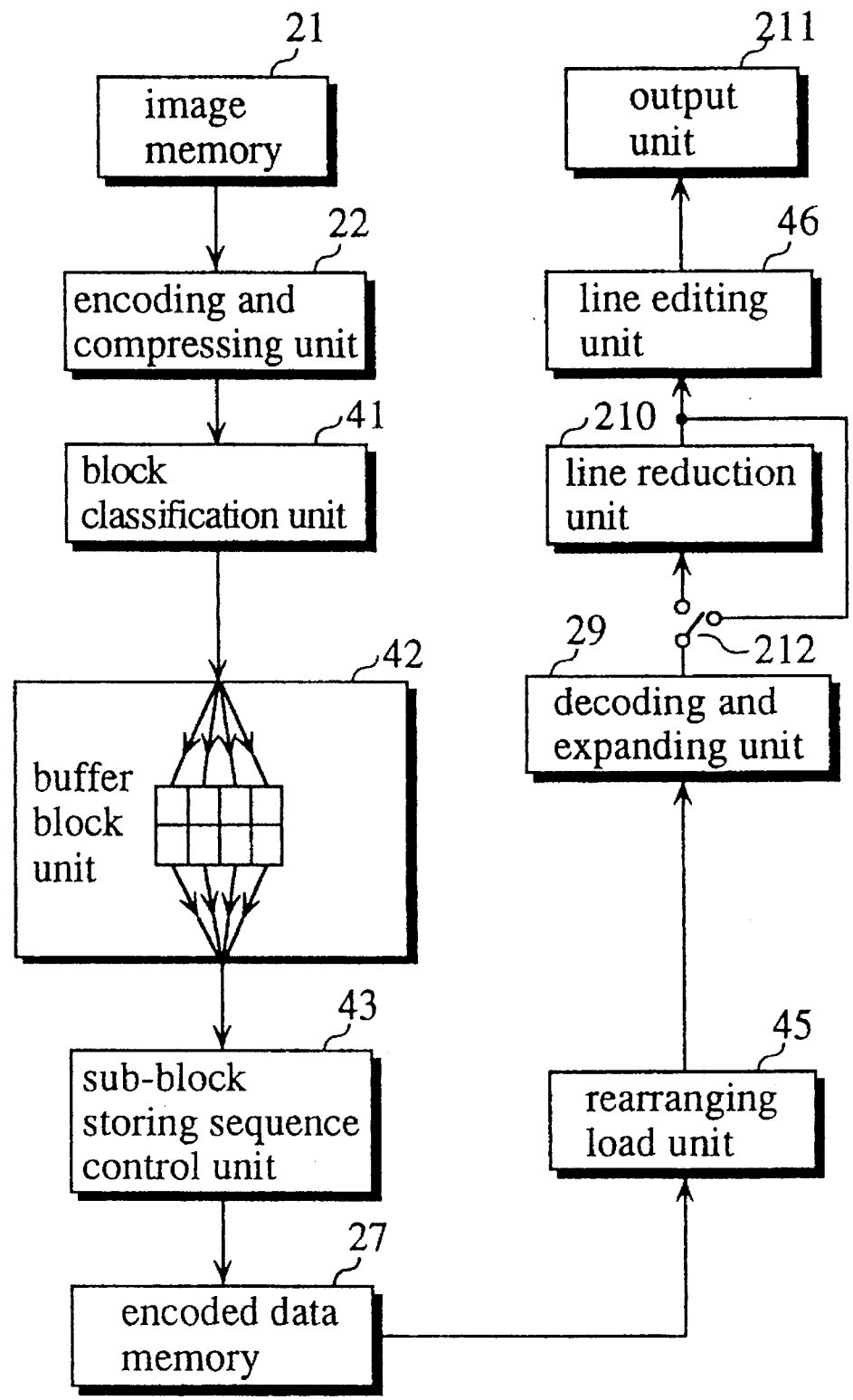
FIG. 6 shows the configuration of a second embodiment.

FIG. 6 shows the configuration of an image storing device, including the image memory 21, the encoding and compressing unit 22, the encoded data memory 27, the decoding and expanding unit 29, the output unit 211, the line reduction unit 210, and the change-over switch 212, which are like components and are labeled with like reference numerals with respect to the first embodiment, and the explanation of these components is not repeated. To be noted, the coding method is one dimension coding like the MH coding.

The components which are unique to the second embodiment will be described.

A block classification unit 41 delivers the encoded, compressed data from the encoding and compressing unit 22 into eight sub-blocks of a buffer block unit 42. The encoded, compressed data is delivered into each of the eight sub-blocks line by line; as a result, each of the eight sub-blocks stores the encoded data which corresponds to the scanning lines at a certain line interval. This operation will be described in detail as referring to FIG. 7. As an example, FIG. 8A (1) shows the image data comprising 32 scanning lines.

The block classification unit 41 accommodates a counter which is incremented at each input of a scanning line (c2), and is cleared to be 1 when its counting value reaches 9 (c3, c4). Thus, the counter is cleared upon every input of eight scanning lines. The destination of each input is determined according to the scanning line number; in other words, the scanning line is delivered to one of the eight sub-blocks according to its line number (c2). This operation continues until the last scanning line is delivered (c5).

The buffer block unit 42 includes eight sub-blocks each of which is dedicated to temporarily store the encoded data. Each of the sub-blocks in FIG. 8A (2) stores the encoded data.

Figure 8B:
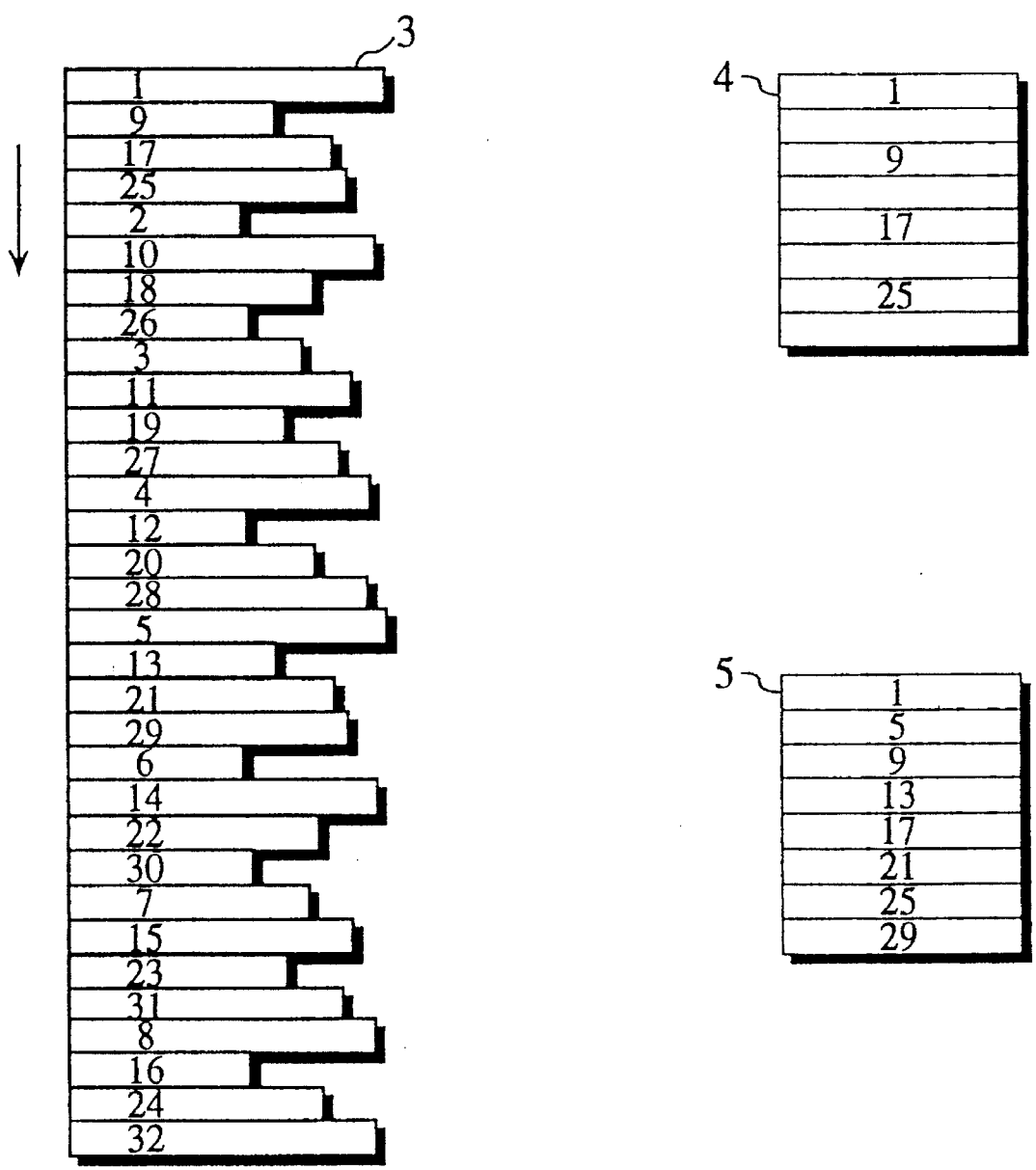

A sub-block storing sequence control unit 43 delivers the encoded data from each of the sub-blocks of the buffer block unit 42 into the encoded data memory 27. More specifically, the encoded data is delivered sub-block by sub-block. The sub-block storing sequence control unit 43 stores sub-block numbers, from one to eight which correspond to the value of the counter c, and recognizes each sub-block by its sub-block number. FIG. 8B (3) shows the encoded data which is stored in the encoded data memory 27. In the figure, the scanning lines contained in the encoded data will be read in the order illustrated by the arrow.

A rearranging load unit 45 rearranges the sequence of the sub-blocks from the encoded data memory 27 according to their output order. Then, it reads the sub-blocks, and delivers them to the decoding and expanding unit 29. Basically, the operation of the rearranging load unit 45 for unreduced output is the same as FIG. 7; therefore, the description thereof will be omitted.

A line editing unit 46 edits the reduced data from the line reduction unit 210 so that the scanning lines therein place at a certain line interval, and delivers the data to the output unit 211.

The reduction output will be described.

The rearranging load unit 45 loads the encoded data from the first and fifth sub-blocks in order. Also, the encoded data from a single sub-block is read in order. The loaded data is delivered to the decoding, expanding unit 212. The rearranging load unit 45 is turned off when all the sub-blocks which correspond to the scanning lines to be outputted are loaded.

The decoding and expanding unit 29 decodes and expands the encoded data, and delivers the decoded data to the line reduction unit 210.

The line reduction unit 210 reduces the decoded, expanded data in the horizontal direction, and delivers it to the line editing unit 46.

The line editing unit 46 edits the data from the line reduction unit 210 by eliminating a line space which will not be decoded nor expanded, and delivers the editing image to the output unit 211.

The line editing unit 46 places the first, ninth, seventeenth, and twenty-fifth lines of the first sub-block data onto the first, third, fifth, seventh scanning lines of the output unit 211, and delivers the first sub-block data to the output unit 211. The output unit 211 displays the first subblock data. FIG. 8B (4) shows the edited image on the output unit 211, in which the data places every other lines of the output unit. Subsequently, the fifth, thirteenth, twenty-first, and twenty-ninth of the fifth sub-block data are placed onto the second, fourth, sixth, and eighth lines of the output unit 211 respectively, and the fifth sub-block data is delivered to the output unit 211.

The output unit 211 outputs the block data.

To be noted, the first block data is displayed on odd number scanning lines while the fifth block data is displayed on even number scanning lines herein. As a result, a more detailed image can be displayed, such as an image 5 in FIG. 8B.

For regular-speed output, every encoded data is read; the encoded data is rearranged by placing a line from a subblock in order (from top to bottom within a single sub-block); and the rearranged data is outputted.

Embodiment 3

A third embodiment will be described as referring to FIGS. 9 and 10.

Figure 9:
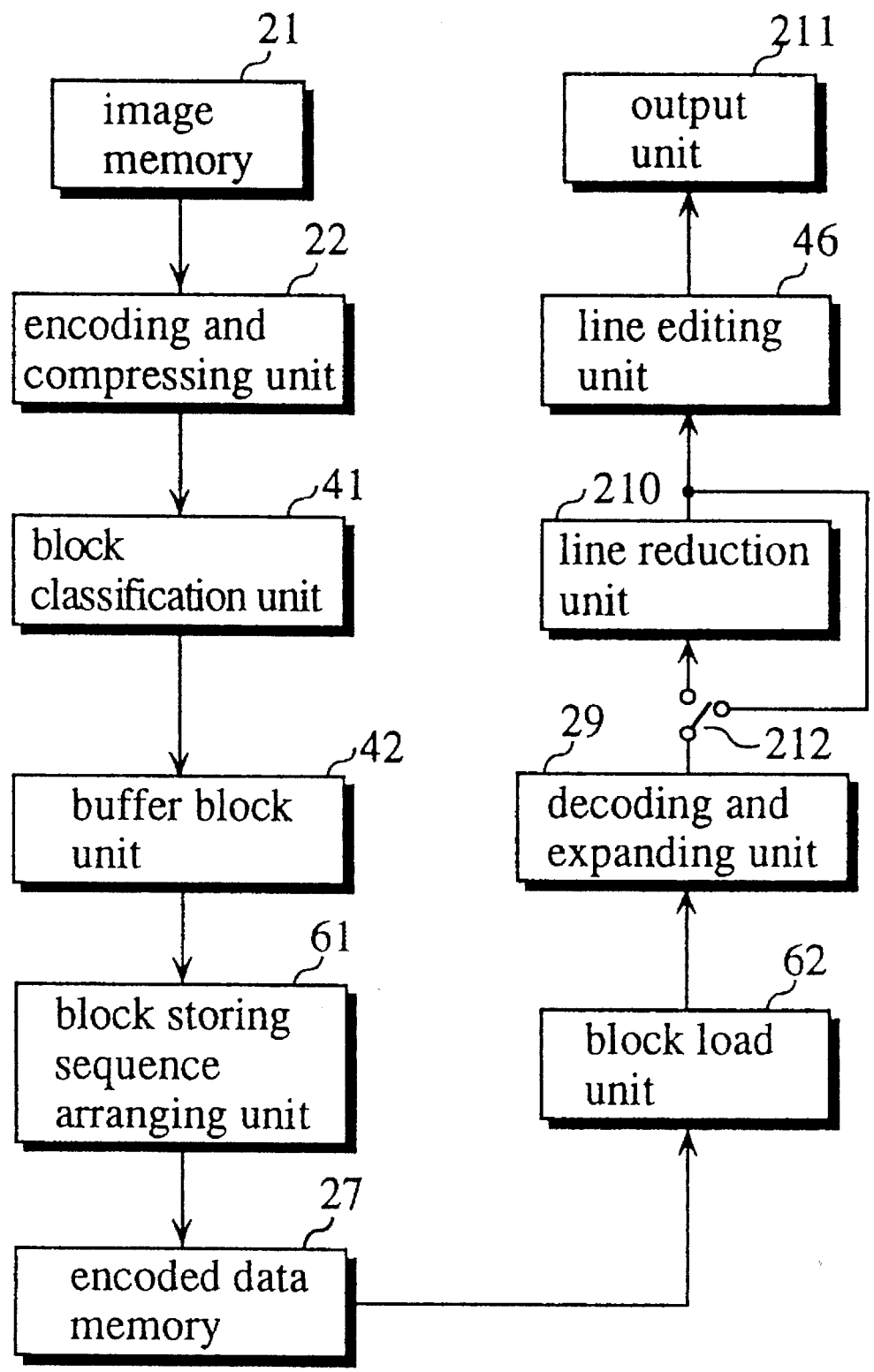
FIG. 9 shows the configuration of a third embodiment.
Figure 10A:
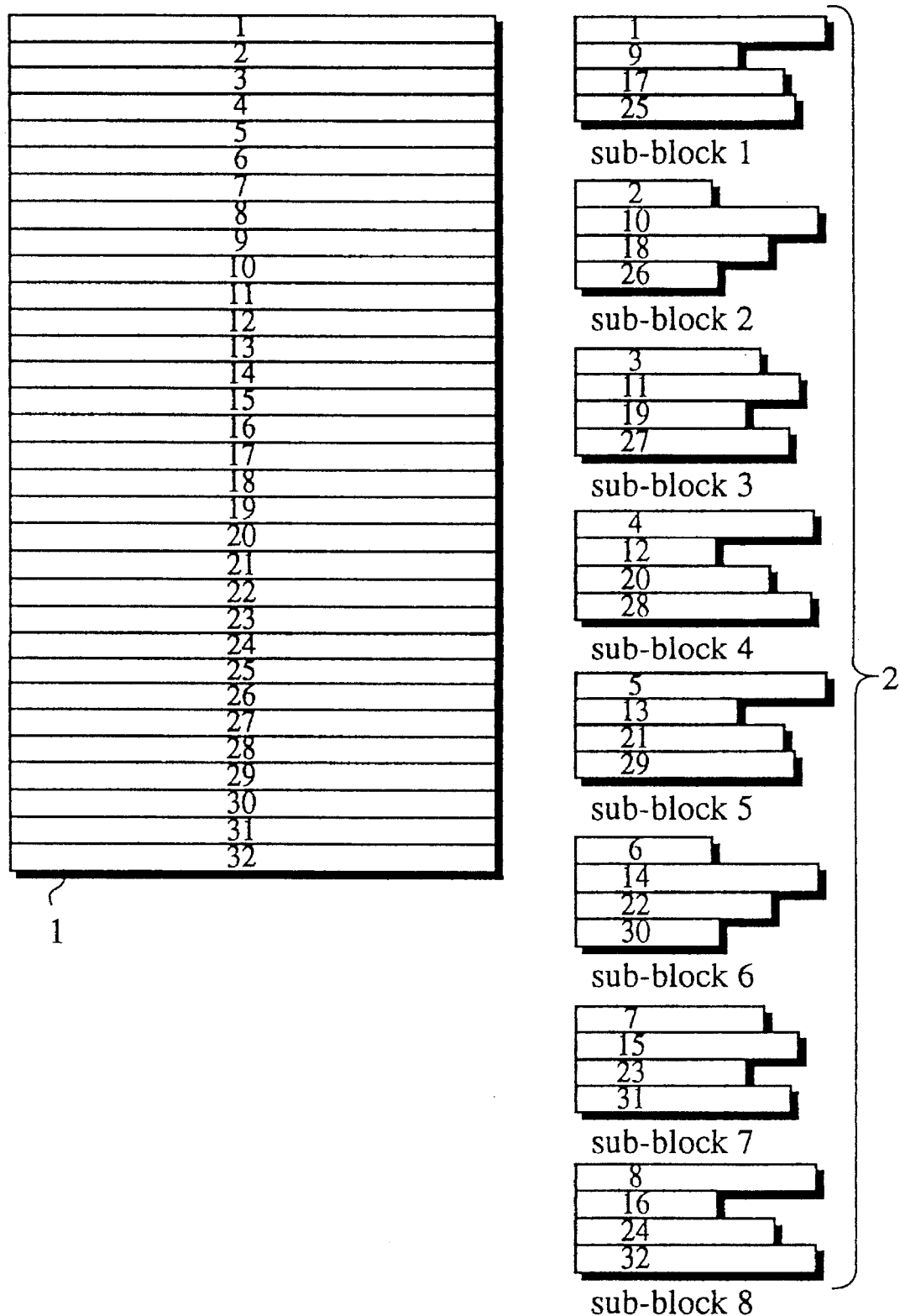
FIG. 10A and FIG. 10B show a first and a second half of the image data respectively.

An image storing device in FIG. 9 includes the image memory 21, the encoding and compressing unit 22, the encoded data memory 27, the decoding and expanding unit 29, the line reduction unit 210, the output unit 211, and the change-over switch 212, which are like components and labeled with like reference numerals with respect to the first and the second embodiment, and the description of these components is not repeated. Also the image storing device includes the block classification unit 41, the buffer block unit 42, and the line editing unit 46, which are like components and labeled with like reference numerals will respect to the second embodiment, and the description of these components is not repeated. To be noted, the coding method is one dimension coding like the MH coding.

The components which are unique to the third embodiment will be described. Like the second embodiment, the total number of the scanning lines included in the original data is 32 (original image 1 in FIG. 10A), and the number of the subblocks is eight.

Figure 10B:
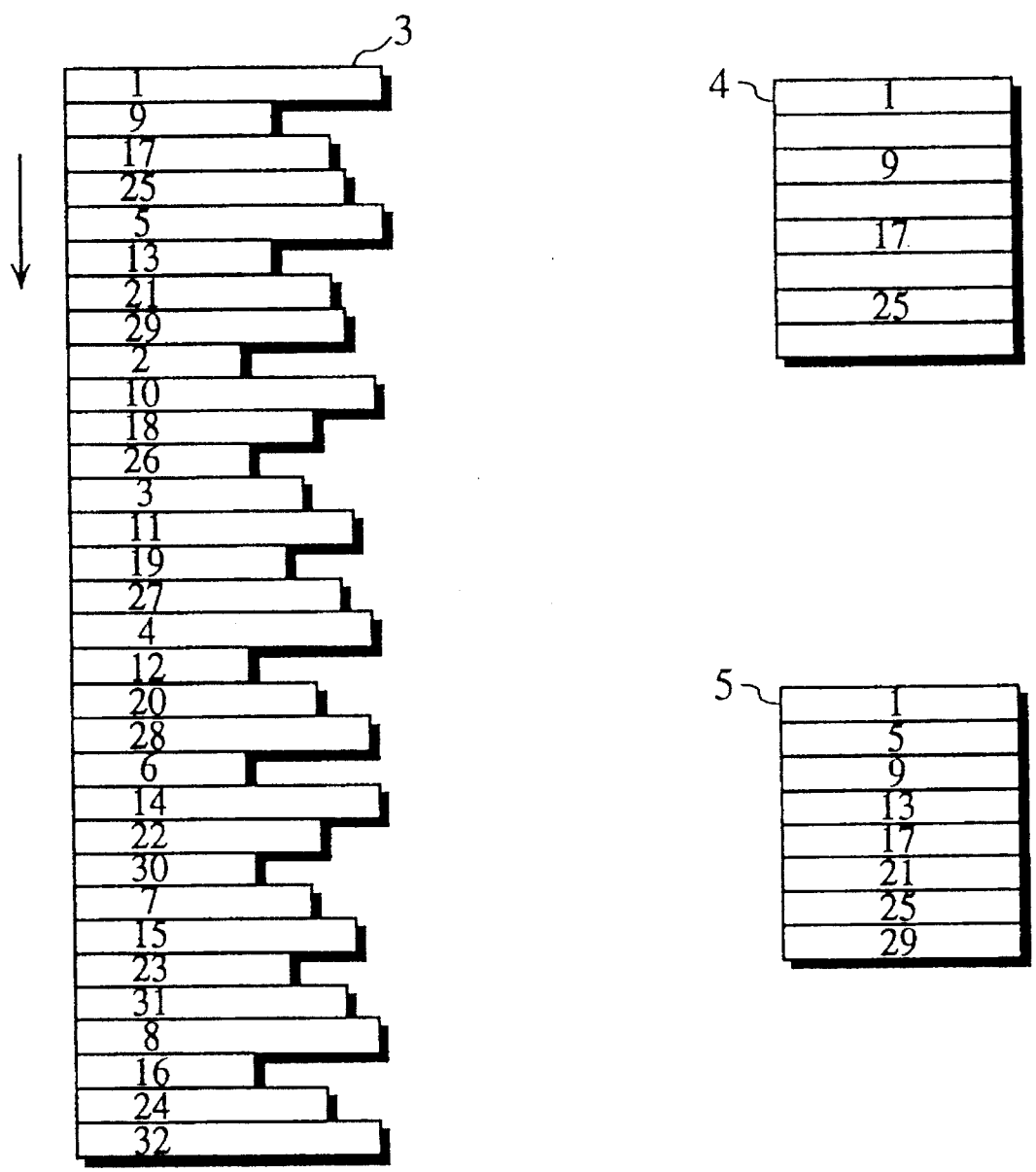

A block storing sequence arranging unit 61 arranges a sequence of the sub-blocks to be delivered to the encoded data memory 27. More specifically, the sub-block data which is subjected to the reduction output receives the first priority, in which the sub-blocks are arranged according to the assigned block numbers, from small to large. Then, the remaining subblocks are arranged according to the assigned sub-block numbers, from small to large. Subsequently, the sub-blocks are delivered to the encoded data memory 27. Thus, the sub-blocks which are subjected to the reduction output are read first in the order of sub-block numbers, then the remaining sub-blocks are read in the order of sub-block numbers. FIG. 10B (3) shows the arranged image data in which the reading order is represented by the arrow.

A block load unit 62 reads the encoded data from the encoded data memory 27 according to the arranged order, and loads it onto the decoding and expanding unit 29. For reduction output, the load operation will be completed when the sub-blocks 1 and 5, which are subjected to reduction output, are loaded. Since the encoded data is arranged according to the reading direction, the reading is faster than the second embodiment. Accordingly, the memory can be accessed (read) more slowly than the second embodiment.

The reduction output is substantially same as the second embodiment. FIG. 10B (4) shows that the first sub-block data is displayed on the odd number scanning lines of the output unit 211; and FIG. 10B (5) shows that the fifth sub-block data is displayed on the even number scanning lines.

For unreduced output, it is necessary to place the formerly read sub-block data for reduced output after the latterly read sub-block data for unreduced output. For example, the fifth sub-block data will be read before the fourth sub-block data; accordingly, the fifth sub-block data is placed at the end of the fourth sub-block data.

Further, various changes and modifications can be applied to above embodiments. Modification examples will be described hereunder.

(1) A line other than (4n−3)th line may be selected. Also a reduction rate other than ¼ may be selected.

(2) Replacement of the reduction rate may be designated by the user according to a resolution of the output unit or a content of the original image.

For example, in the first embodiment the reduction rate can be changed by having software or hardware means change the counter's value from four into another. The means for operating the following functions are also necessary to change the reduction rate.

(A) The high-speed display buffer and the regular-speed display buffer have some extra capacity.

(B) The constant value employed by the storing sequence control unit and the load unit is changed in accordance with the new reduction rate; accordingly, the storing sequence control unit delivers the encoded data to the encoded data memory and the load unit retrieves the data from the encoded data memory according to the new reduction rate.

(C) The reduction rate for the line reduction unit is also renewed.

(d) K parameter is also renewed for the MR coding.

The above functions are operated automatically.

In the second and third embodiments, the reduction rate can be easily changed by making some extra sub-blocks in the buffer block unit or making some extra capacity within each sub-block.

As stated above, the line reduction unit divides each line into pixel groups and extracts the pixel which places at the left end of each pixel group. Therefore, to change the line reduction rate, one pixel group comprises a different number of pixels. For example, when the reduction rate is ½, a pixel group includes two pixels; accordingly every other pixel will be extracted. When the reduction rate is ⅓, one pixel group includes three pixels; accordingly one for every three pixels will be extracted. The remainder pixels on the line will be abandoned.

(3) If a relatively large size, and costly computer or an encoded data memory which can be accessed at a high speed is available, the same benefits of the embodiments will be obtained by storing the encoded data line by line, and assigning a line number to each line so that the encoded data will be stored, read, and decoded line by line.

For example, the encoded data is divided into two blocks, one of which is for the odd number scanning lines and the other is for the even number scanning lines. When displaying a ½ reduction image at a high speed, either of the two blocks is read, and mounted onto both the odd number scanning lines and the even number scanning lines of the display unit. Accordingly, a ¼ (2×2) reduction images are displayed on the CRT.

If a number of encoded data memories which can be accessed independently are available, one encoded data memory may be assigned to each sub-block, and some of the encoded data memories may be accessed at reduction output.

(4) For the convenience of manufacturing, producing, and designing, each of the above components may be physically unified as hardware; otherwise each component may be comprised of software, or unified as software.

(5) Any coding method can be employed.

(6) With most of the recent methods, an image data is encoded, compressed and displayed on the CRT line by line. Also usually a scanning line extends horizontally. Therefore, the encoded, compressed image data is processed line by line in the above. However, if the scanning line extends vertically, or the display unit is controlled row by row (vertically), the encoded, compressed data will be processed vertically.

(7) If the encoding, compressing unit and the output unit have different pixel densities to each other, an adjustment device may be employed. It is assumed that the pixel density of the display unit is more rough than the pixel density of the encoding, compressing unit; 2×2 pixels of the encoding, compressing unit corresponds to 1×1 pixels having contrast of the output unit; the encoding, compressing unit is for an color image, and the display unit is for a black and white image. To amend the density difference, the data relating to color information may be abandoned.

(8) The black and white image may be enough just for searching. Therefore, a colored original image may be reduced into the black and white image. For example, the encoded data for the color image is divided into blocks each representing red, blue, and green color. Then, only the red block is further divided into two sub-blocks, and each of the sub-blocks is displayed on the display unit as reduced black and white images at a high speed.

(9) The image storing device may enable the printing of reduced images onto a paper.

(10) The image storing device may be capable of storing the unreduced image and the reduced images into a removable device such as floppy disks so that they can be retrieved by another device.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image storing device for compressing a scanned original image and storing the compressed image as well as expanding the stored image and outputting the expanded image, comprising:

an encoding and compression unit for encoding and compressing image data for each scanning line;

a classification unit for classifying the encoded and compressed image data into one of a reduction encoded data at a predetermined reduction rate and remaining encoded data;

a first display buffer for receiving the reduction encoded data;

a second display buffer for receiving the remaining encoded data, the first display buffer operates at a higher speed than the second display buffer;

an encoded data memory unit;

a storing sequence control unit for storing a sequence of encoded data into the encoded data memory unit, wherein the encoded data from the higher speed first display buffer is prioritized over the encoded data from the second display buffer;

means for designating a directional signal indicative of the speed of output;

a load unit for reading the encoded data memory unit in accordance with the directional signal to provide either a high speed output or a regular speed output, wherein when high speed output is designated, the load unit will read the prioritized encoded data and when a regular speed output is designated, the load unit will read a scan line of the prioritized encoded data and scan lines of the remaining encoded data in a proportional manner to the predetermined reduction rate;

a decoding and expanding unit for decoding and expanding the compressed data from the load unit; and a display unit for displaying the image from the decoded and expanded data.

2. The image storing device of claim 1 further including a line reduction unit for reducing the decoded and expanded compressed data prior to providing it to the display unit to provide a high speed output of images, the line reduction unit operates upon the encoded data representative of the prioritized scan lines by extracting pixels in accordance with a predetermined reduction rate whereby expedited reduced images can be displayed.

* * * * *